US012687818B2

(12) United States Patent
Huot-Marchand et al.

(10) Patent No.: US 12,687,818 B2
(45) Date of Patent: Jul. 21, 2026

(54) TIMEPIECE WITH LOCALISED ILLUMINATION

(71) Applicant: ETA SA Manufacture Horlogère Suisse, Grenchen (CH)

(72) Inventors: Sylvain Huot-Marchand, Eschert (CH); Dominique Dubugnon, Saint-Prex (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 304 days.

(21) Appl. No.: 18/503,282

(22) Filed: Nov. 7, 2023

(65) Prior Publication Data

US 2024/0210882 A1 Jun. 27, 2024

(30) Foreign Application Priority Data

Dec. 22, 2022 (EP) .................................... 22215944

(51) Int. Cl.
*G04B 19/30* (2006.01)

(52) U.S. Cl.
CPC .................................... *G04B 19/30* (2013.01)

(58) Field of Classification Search
CPC .... G04B 19/30; G04B 19/32; G04B 45/0015; G04B 45/0076; G04G 17/02; G04G 9/0041; G04C 10/02
See application file for complete search history.

(56) References Cited

U.S. PATENT DOCUMENTS

2006/0028920 A1* 2/2006 Kojima .................. H02S 10/40 257/E31.128
2006/0067167 A1 3/2006 Garay et al.
2008/0062821 A1 3/2008 Yan
(Continued)

FOREIGN PATENT DOCUMENTS

CH 718 715 A2 12/2022
EP 2 290 478 A1 3/2011
(Continued)

OTHER PUBLICATIONS

JP-2022187978-A Machine Translation from PE2E Search (Year: 2022).*
(Continued)

*Primary Examiner* — Regis J Betsch
*Assistant Examiner* — Kevin Andrew Johnston
(74) *Attorney, Agent, or Firm* — Oblon, McClelland, Maier & Neustadt, L.L.P.

(57) ABSTRACT

A timepiece including at least one timepiece external element including a visible face formed by a transparent or translucent body including an autonomous lighting device, the timepiece external element being formed by an assembly of a plurality of stacked layers connected together, each including one or more of the following functional elements of the lighting device: at least one light source capable of generating light in the visible face of the timepiece external element; a self-contained power supply unit; and a control unit configured to manage the operation of the light source; the at least one light source being configured to produce localised light on a point or quasi-point area of the visible face of the timepiece external element, so as to produce localised illumination on the timepiece external element.

15 Claims, 3 Drawing Sheets

(56) References Cited

U.S. PATENT DOCUMENTS

| | | | | |
|---|---|---|---|---|
| 2012/0120776 | A1 * | 5/2012 | Fleury | G04B 19/30 368/205 |
| 2014/0301168 | A1 | 10/2014 | Fleury et al. | |

FOREIGN PATENT DOCUMENTS

| | | | | | |
|---|---|---|---|---|---|
| JP | 2013-503327 | A | | 1/2013 | |
| JP | 2015052520 | A | * | 3/2015 | |
| JP | 2016-109522 | A | | 6/2016 | |
| JP | 2018-194310 | A | | 12/2018 | |
| JP | 2022187978 | A | * | 12/2022 | G04B 37/225 |
| KR | 20100009707 | U | * | 10/2010 | G04B 19/30 |

OTHER PUBLICATIONS

Japanese Office Action issued on Dec. 3, 2024 in Japanese Patent Application No. 2023-191725, 5 pages.

Japanese Office Action issued on Apr. 22, 2025 in Japanese Patent Application No. 2023-191725, 2 pages.

European Search Report issued May 30, 2023 in European Application 22215944.4 filed on Dec. 22, 2022, 3 pages (with English Translation of Categories of Cited Documents).

* cited by examiner

TIMEPIECE WITH LOCALISED ILLUMINATION

CROSS-REFERENCE TO RELATED APPLICATION

This application claims priority to European Patent Application No. 22215944.4 filed on Dec. 22, 2022, the entire disclosure of which is hereby incorporated herein by reference.

TECHNICAL FIELD OF THE INVENTION

The present invention relates to a timepiece with localised illumination comprising at least one timepiece external element equipped with a completely autonomous lighting device. More specifically, the present invention relates to a timepiece featuring original localised lighting effects, for functional, aesthetic and/or entertainment purposes.

TECHNOLOGICAL BACKGROUND

Creating timepieces such as wristwatches with an improved aesthetic appearance is of constant concern for watch manufacturers and particularly for those responsible for designing the various external elements. It would take too long to list here all the solutions that have been considered to give a timepiece as neat and aesthetically pleasing an appearance as possible. Examples include the engine-turning technique used on dials, the shape and/or colour of dial appliques or hands, and the addition of precious or semi-precious stones.

In this context, it is understood that there is a need to find a solution that does not have the drawbacks of the prior art and that aims to offer customers watches with an appearance that is both aesthetic, surprising and functional.

SUMMARY OF THE INVENTION

The invention overcomes the drawbacks of the prior art by providing a timepiece with localised illumination at several points on the timepiece, which is simple to produce and offers original, localised lighting effects for functional, aesthetic and/or entertainment purposes.

To this end, the present invention relates to a timepiece comprising at least one timepiece external element comprising a visible face formed by a transparent or translucent body comprising an autonomous lighting device, said timepiece external element being formed by an assembly of a plurality of stacked layers connected together, each comprising one or more of the following functional elements of said lighting device:

- at least one light source capable of generating light in the visible face of the timepiece external element;
- a self-contained power supply unit; and
- a control unit configured to manage the operation of the light source;

said at least one light source being configured to produce localised light on a point or quasi-point area of the visible face of the timepiece external element, so as to produce localised illumination on said timepiece external element.

In other embodiments:

- said assembly consists of a first layer forming the visible face comprising said at least one point light source;
- each point light source is a light-emitting element;
- each point light source is a quantum box or dot.

- said assembly comprises, in addition to the first layer, the following successive layers:
  - a second layer comprising a photovoltaic module constituting the self-contained power supply unit;
  - a third layer comprising an electrical accumulator constituting the self-contained power supply unit;
  - a fourth layer forming a hidden face of the timepiece external element comprising the control unit;
- said assembly comprises, in addition to the first layer, the following successive layers:
  - a second layer comprising a photovoltaic module constituting the self-contained power supply unit; and
  - a third layer forming a hidden face of the timepiece external element comprising the control unit and an electrical accumulator constituting the self-contained power supply unit;
- the functional elements are printed on substrates making up the layers of the assembly forming said at least one timepiece external element;
- the first layer is rigid relative to the other layers in the assembly, which are flexible;
- the point light sources are configured in such a way that each point or quasi-point area of the visible face that can be illuminated is capable of being illuminated by a single monochromatic point light source.
- the point light sources are configured in such a way that each point or quasi-point area of the visible face that can be illuminated is capable of being illuminated by several point light sources having different light colours;
- said at least one timepiece external element is chosen from one of the following: a back, a middle, a dial, a bracelet strand, a bezel, a flange, a push-button, a winding button and/or a winding button fitted with a cap.

BRIEF DESCRIPTION OF THE FIGURES

The purposes, advantages and features of the timepiece according to the invention will appear more clearly in the following description which is given on the basis of at least one non-limiting embodiment shown by way of the drawings, in which.

DETAILED DESCRIPTION OF THE INVENTION

Figure 1:
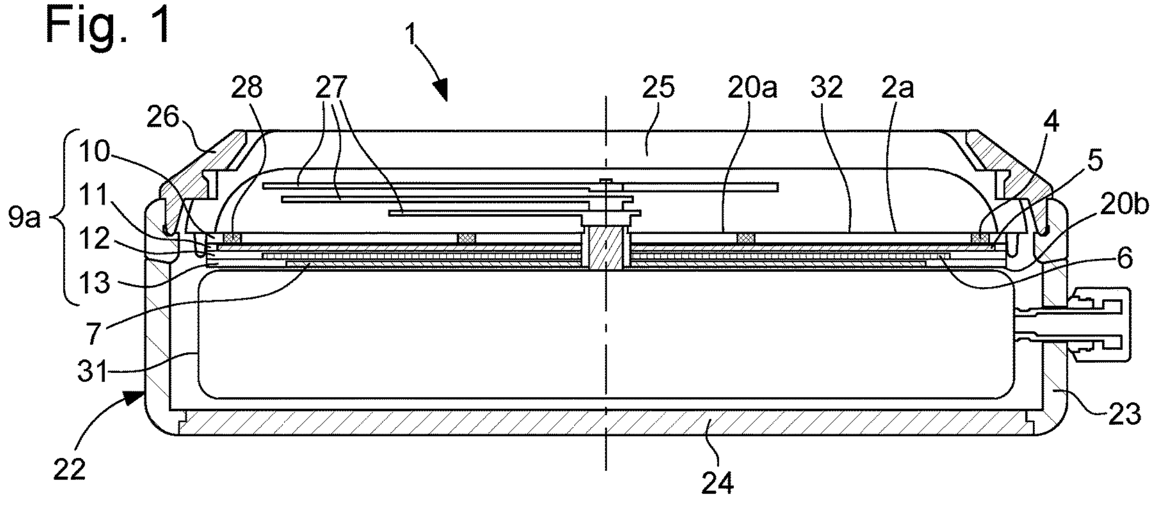
FIG. 1 is a sectional view of a case of a timepiece equipped with a timepiece external element such as a dial provided with an autonomous lighting device according to embodiments of the invention.

The present invention was drawn from the general inventive idea consisting of housing one or more point light sources 4 in at least one timepiece external element 2*a*, 2*b*, 2*c* of a timepiece 1. This timepiece external element 2*a*, 2*b*, 2*c* comprises a visible face 20*a* formed by a transparent or translucent body which is also referred to as the "visible part" or "visible upper part", and further comprises a hidden face 20*b* otherwise referred to as the "hidden part" or "hidden lower part" of this element 2*a*, 2*b*, 2*c*. In this configuration, the light produced by each light source 4 is localised to a point or quasi-point area 28 of this visible face 20*a* of the timepiece external element 2*a*, 2*b*, 2*c* concerned, so as to produce localised illumination on said timepiece external element 2*a*, 2*b*, 2*c*. This thus provides a timepiece 1 with localised illumination at several points on the timepiece 1, which is simple to produce and offers original, localised lighting effects for functional, aesthetic and/or entertainment purposes. When the illumination is switched on, the localised light areas 28 on the timepiece external element 2*a*, 2*b*, 2*c* transmit a more or less hard and diffuse light depending on the construction and the installed lighting power, thus creating functional and/or aesthetic effects by contrasting with the non-illuminated parts of the timepiece external element 2*a*, 2*b*, 2*c*.

It should be noted that such illumination can have a more or less diffuse, discreet, soft and pleasant appearance, and these features can be varied practically ad infinitum depending on the desired aesthetic result, which increases the final aesthetic quality of the timepiece 1.

Such a timepiece 1 according to the invention can be, for example, an electronic, electromechanical and/or mechanical watch, and in particular a sports watch or a so-called "luxury" watch.

In the context of this invention, a "point or quasi-point area" is understood to mean any localised area on/in the visible face 20*a* of the body of the timepiece external element 2*a*, 2*b*, 2*c* concerned, and has dimensions such that it is perceived as separate from neighbouring areas by the human eye.

In this timepiece, the timepiece external elements 2*a*, 2*b*, 2*c* correspond to all of the component parts of the timepiece 1 surrounding a movement 31, thus giving this timepiece 1 its aesthetics and style, and further allowing all of its functions to be indicated. More specifically and with reference to FIGS. 1 and 6, these component parts considered here include, in a non-exhaustive and non-limiting manner: a back 24, a middle 23, a dial 32, bracelet strands 29, a bezel 26, a push-button, a flange, a hand, a winding button and/or a button cap.

In the following description, all of the parts of the timepiece 1 that are well known to a person skilled in the art will only be explained in a simplified manner.

FIG. 1 is a sectional view of a middle which, together with a back 24 and a dial 32, delimits an interior volume of a case 22 of this timepiece 1. The case 22 is closed at the top by a crystal 25. For the purposes of this description, it will be assumed that the timepiece 1 is a mechanical watch and that the movement 31 thereof is disposed in the case 22. In this configuration, at least one timepiece external element 2*a*, 2*b*, 2*c* of this timepiece 1 comprises an autonomous lighting device 3 (visible in FIGS. 1, 2 and 4) provided with at least one point light source 4. The light emitted by this said at least one source 4 illuminates a point or quasi-point area 28 of the timepiece external element 2*a*, 2*b*, 2*c* to be illuminated, i.e. the dial 32 in the particular embodiment shown in FIG. 1 or the bezel 26 in one embodiment shown in FIGS. 6 to 8. For this purpose, the light emitted by each point light source 4 can, for example, be collimated or focused towards the point or quasi-point area 28 in question, by any known collimation or focusing means.

It should be noted that in the example embodiment of the invention described, the horological movement 31 is a mechanical movement. In one alternative embodiment, this movement 31 can be an electronic movement or an electromechanical movement. A watch can be referred to herein as mechanical when its movement is mechanical, and as electromechanical or electronic when it comprises electromechanical or electronic movements respectively.

In this configuration, the horological movement 31 drives, in a manner known to a person skilled in the art, hands 27 comprising an hour hand, a minute hand and optionally a seconds hand. To this end, the dial 32, 2*a*, 2*b* includes a through-hole receiving the arbor of the hands.

In the particular embodiment shown in FIG. 1, the timepiece external element 2*a*, 2*b*, in this case a dial 32, thus comprises the autonomous lighting device 3. This lighting device 3 has its own power supply means, as will be seen hereinbelow. Such a lighting device 3 is said to be autonomous in particular relative to the movement 31 of the timepiece 1 and in particular relative to the power source of this movement 31, for example when this power source is an electrical power supply as in an electromechanical movement or an electronic movement. Under these conditions, it is understood that the power used by this lighting device 3 is not used to the detriment of the autonomy of the movement 31.

This lighting device 3 comprises the following functional elements: said at least one point light source 4, a power supply unit 21 and a control unit 7.

In this lighting device 3, the power supply unit 21 comprises an electrical accumulator 6 and a photovoltaic module 5, also referred to as solar cells. This photovoltaic module 5 is connected to the electrical accumulator 6 via connection elements given the reference numerals 17*b* and 18 in FIGS. 3 and 5. This photovoltaic module 5 can comprise one or more unit cells of the heterojunction or multijunction type, connected in parallel or in series. The photovoltaic cells of this module 5 can be made, in a manner known to a person skilled in the art, from semiconductor materials containing copper, indium, gallium and selenium, containing cadmium telluride, containing monocrystalline gallium arsenide or containing monocrystalline or polycrystalline silicon, or perovskites. It should be noted that these examples are not limiting and that a person skilled in the art will be able to find the type of photovoltaic cells suitable for the invention.

In this lighting device 3, the control unit 7, also referred to as a microcontroller, comprises an electronic circuit 8 including hardware resources, in particular at least one processor cooperating with memory elements as well as address, data and control buses. This control unit 7 includes, in its memory elements, an algorithm for managing the illumination of said at least one light source 4. Such an algorithm is executed by the processor of this control unit 7, taking account in particular of data from event sensors included in the lighting device 3 in order to manage the operation of said at least one light source 4.

It should be noted that such data can, for example, provide information relating to events detected by these sensors, said events being likely to contribute to the operation of said at least one light source 4. These events can include, in a non-limiting and non-exhaustive manner: the detection of a particular brightness level in the environment of the timepiece 1, the detection of a particular sound element or a particular sound level, the detection of a particular visual object, the detection of a movement made by this timepiece 1, etc.

In this context, the event sensor of this autonomous lighting device 3 comprises in particular and in a non-limiting and non-exhaustive manner:

- a brightness sensor to detect the ambient brightness level;
- a motion sensor such as a gyroscopic and/or inertial sensor in the form of an electronic component of the gyroscopic and/or inertial microelectromechanical system circuit type;
- a microphone-type sound sensor, and/or
- an optical sensor of the photographic sensor type.

It should further be noted that this control unit 7 is able to manage/control the operation of the light sources 4 simultaneously and/or in sequence. Furthermore, each light source 4 is managed/controlled by this control unit separately. In this context, the management of the operation of each light source 4 can consist of, in a non-limiting and non-exhaustive manner, the following operations: sequentially switching on or off, or simultaneously switching on or off of two or more light sources 4, flashing one or more light sources 4, or defining a flashing frequency for each light source 4, a flashing duration for each light source 4, or a switching on or off duration for each light source 4, etc.

Such a control unit 7 can further include, in its memory elements, an algorithm for managing the electrical accumulator 6, in particular for managing its recharging by the photovoltaic module 5 and for managing the electricity consumption of said light source 4.

With reference to FIGS. 2 to 8 and as mentioned above, the autonomous lighting device 3 is thus included in the timepiece external element 2*a*, 2*b*, 2*c*. In this configuration, the functional elements of this lighting device 3, i.e. the light source 4, the electrical accumulator 6, the photovoltaic module 5 and the control unit 7, are included in one or more layers 10, 11, 12, 13, 14 forming the timepiece external element 2*a*, 2*b*, 2*c*.

In other words, the body of this timepiece external element 2*a*, 2*b*, 2*c* is formed by an assembly 9*a*, 9*b* of a plurality of stacked layers 10, 11, 12, 13, 14 connected together and each comprising one or more functional elements of the lighting device 3.

In this assembly 9*a*, 9*b*, the layers 10, 11, 12, 13, 14 are joined together by a joining element such as an adhesive substance so as to unify them in order to obtain a monolithic assembly 9*a*, 9*b* thus forming a one-piece timepiece external element 2*a*, 2*b*. Such layers 10, 11, 12, 13, 14 are stacked in the assembly 9*a*, 9*b*, and are arranged one on top of the other in a defined order.

Thus, such a one-piece timepiece external element 2*a*, 2*b*, 2*c* (e.g.: dial, bezel) has the additional advantage of being able to be removably mounted on a case of the timepiece 1, in addition to facilitating its integration into or onto such a case.

More specifically, in first and second alternative embodiments, this assembly 9*a*, 9*b* comprises a first layer 10 forming/constituting a visible face 20*a* of the timepiece external element 2*a*, 2*b*, 2*c*. Such a first layer 10 is formed by a transparent or translucent or at least partially transparent or at least partially translucent substrate which is rigid or semi-rigid. Such a substrate is made of a material having a transmittance to light radiation, such as solar radiation, in particular to ultraviolet radiation, also known as UVT (for "Ultra-Violet Transmission"), of between 65 and 95 percent. This transmittance is preferably 85 percent. Such a material can be transparent or translucent. This material can be, in a non-limiting and non-exhaustive manner, a polymer, glass or ceramic.

In this context, it is understood that this substrate is configured so that:

- the light produced by said at least one light source 4 can escape to the outside of the timepiece external element 2*a*, 2*b*, 2*c* and thus of the timepiece 1, and
- the light coming from the environment of the timepiece 1 can penetrate the timepiece external element 2*a*, 2*b*, 2*c* in the direction of the photovoltaic module 5 of the lighting device 3, this light comprising solar radiation when it is of natural origin.

In other words, this transparent or translucent substrate is configured so that light radiation such as solar radiation can pass through it and power the photovoltaic module 5 so that the latter can convert the solar energy from this radiation into electrical energy.

Such a first layer 10 comprises said at least one light source 4 of the lighting device 3 of the timepiece external element 2*a*, 2*b*, 2*c*.

In this device 3, any type of point light source 4, such as a light-emitting element, can be used, for example:

- a light-emitting capacitor known by the acronym LEC;
- a light-emitting diode of the LED, OLED (Organic Light-Emitting Diode), AMOLED (Active-Matrix Organic Light-Emitting Diode) or QLED (Quantum Light-emitting Diode) type;
- any light-emitting material activated by a local electric field;
- any light-emitting material activated by an electric current;
- any combination of these light-emitting elements.

Figure 6:
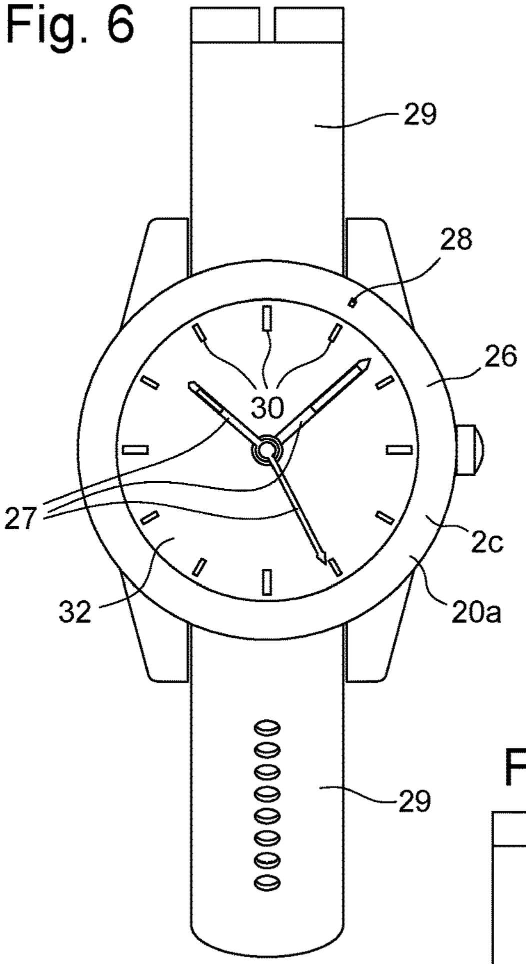
FIGS. 6 to 8 are top views of timepieces, each comprising a timepiece external element such as a bezel comprising a plurality of light sources, according to the embodiments of the invention.
Figure 7:
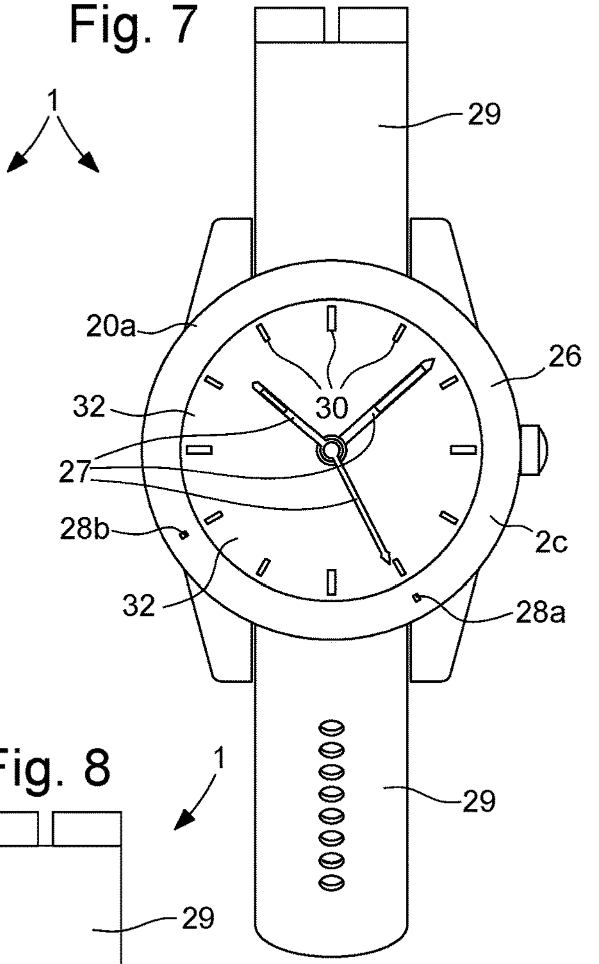
Figure 8:
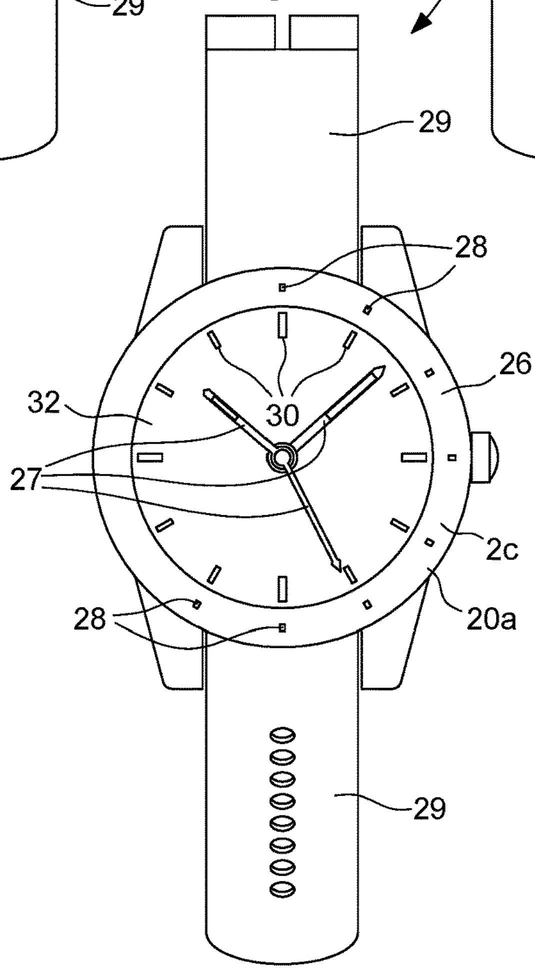

This said at least one light source 4 is arranged in a particular way on or in the substrate forming this first layer 10. Such an arrangement of the light source 4 is configured to illuminate all or part of the visible face 20*a* of the timepiece external element 2*a*, 2*b*, 2*c*. For example, when this timepiece external element 2*a*, 2*b*, 2*c* is a dial 32 as shown in FIG. 1, or a bezel 26 as shown in FIGS. 6 to 8, all or part of the visible face 20*a* of this dial 32, 2*a*, 2*b* or of the bezel 26, 2*c* can be illuminated, or at least one graphic representation present in or on the lower surface of this visible face 20*a* can be illuminated, such as:

- a reference (or display) element such as, for example, a numeral, an index, a line or even a point contributing, with or without the hands, to the display of a horological information/parameter or a physical information/parameter measured by a sensor or the like included in the movement 31;
- an inscription, a pattern, a text, a logo, etc.

This lighting can be backlighting or semi-direct lighting when the light source 4 is arranged in a cavity defined in the substrate. More specifically, this cavity can be a blind opening made in the lower surface of this substrate. In this configuration, when the bottom of this cavity includes a graphic representation, the light radiation, or the light, produced by this light source 4 can escape to the outside of the dial 2*a* through the visible face 20*a* of this dial 2*a*, thus allowing at least one graphic representation to be viewed in the dark. In particular, the light radiation escaping from the visible face 20*a* draws the outline of this graphic representation. In this context, this graphic representation included in or on the upper surface or on the lower surface of the substrate forming the first layer 10, is preferably opaque or non-translucent or non-transparent.

This lighting can be direct lighting when the light source 4 is arranged in a cavity defined in the substrate. This cavity can be a blind opening made in the lower surface of this substrate, the bottom of which is devoid of any graphic representation. In this configuration, the light radiation, or the light, produced by this light source 4 can escape through the bottom of this cavity towards the outside of the dial 2*a* and thus through the visible face 20*a* of this dial 2*a*.

This lighting can also be direct lighting when the light source 4 is arranged in a through-opening made in the substrate. In this context, this opening extends through the thickness of the substrate of this first layer 10, opening out at its two ends respectively onto the upper and lower surfaces of this substrate. In this configuration, all or part of the light source 4 can project from the upper surface of this substrate and thus from the visible face 20*a* of this timepiece external element 2*a*, 2*b*, 2*c*.

Such lighting can also be indirect lighting when said at least one light source 4 is coupled to at least one waveguide. This waveguide, also referred to as a light guide, is used to carry the light from the place where it is injected into the guide to the point or quasi-point area 28 of the timepiece external element 2*a*, 2*b*, 2*c* to be illuminated. The light guide is, for example, an optical fibre that allows any obstacles that may appear in the substrate between the light-emitting element and the relevant point or quasi-point area 28 of the substrate through which the light will escape to be bypassed. In this alternative embodiment, it is thus the light that is carried, via the waveguide, from the light-emitting element to the point or quasi-point area 28 of the substrate to be illuminated.

In such a configuration, a first end of the waveguide is coupled to the light source 4 and a second end of this waveguide can be arranged in:

- a cavity which can be a blind opening made in the lower surface of the substrate of this first layer 10, or
- a through-opening extending through the thickness of the substrate of the first layer 10 and opening out at its two ends respectively onto the upper and lower surfaces of this substrate and thus of the first layer 10. This second end can thus project from the upper surface of this substrate and thus from the visible face 20*a* of the timepiece external element 2*a*, 2*b*, 2*c*.

In this context, indirect lighting can be achieved by a single light source 4 included on the lower surface of the substrate of this first layer 10 and coupled to several waveguides, the second ends of which are arranged in:

- cavities, each emitting light radiation from this light source 4, this radiation escaping to the outside of the timepiece external element 2*a*, 2*b*, 2*c* through its visible face 20*a*, thus allowing at least one graphic representation located at the bottom of this cavity to be viewed, in particular in the dark, and/or
- through-openings projecting or not projecting from the upper surface of the substrate of this first layer 10 in order to form graphic representations such as marker elements, each emitting light radiation from this light source 4.

In the substrate of this first layer 10, the light source 4 is applied/attached to the lower surface of this substrate, in said cavity or on an internal wall of the aforementioned through-opening, by printing or evaporation.

In a particular embodiment of the invention, light-emitting elements, each emitting ultraviolet, violet, blue, white or infrared light are used in combination with the substrate of the first layer 10 forming the visible face 20*a* of the timepiece external element 2*a*, 2*b*, 2*c* and comprising an at least partially transparent or translucent material filled with fluorescent and/or phosphorescent particles. This substrate of the first layer 10 is filled at the one or more places where light is intended to escape from within or from the lower face of the substrate. In this way, the fluorescent and/or phosphorescent particles absorb the radiation emitted by each light-emitting element and re-emit homogeneous visible light. Depending on the type of fluorescent and/or phosphorescent particles chosen, the luminous effect ceases as soon as the light source 4 is switched off or continues as a result of the afterglow effect. Alternatively, but not shown in the figures, the point light sources can be quantum dots or quantum boxes.

In a particular embodiment of the invention, each point light source 4 is a monochromatic light source, and each point or quasi-point area 28 of the substrate of the first layer 10 that can be illuminated, is illuminated by a single monochromatic point light source 4. In another embodiment of the invention, the point light sources 4 are configured to have different light colours, and each point or quasi-point area 28 of the substrate that can be illuminated, is then illuminated by several of these point light sources 4. It should also be noted that, in another embodiment, each light source 4 can vary between different colours.

Moreover, it should be noted that the lower surface of this first layer 10 can be self-adhesive so that it can contribute to the assembly thereof with the second layer 11.

In the assembly 9*a*, 9*b* forming the timepiece external element 2*a*, 2*b*, 2*c*, the second layer 11 comprises a substrate including the photovoltaic module 5. This substrate is preferably flexible or pliable. Such a substrate can be a film on which this photovoltaic module 5 is arranged, for example, this substrate can be made of a material belonging to the polymer family. Such a photovoltaic module 5 preferably extends over the whole of a so-called active area of an upper surface of this substrate of the second layer 11. This active area is a portion of this upper surface of the substrate which is able to receive the light coming from the lower surface of the first layer 10 of the timepiece external element 2*a*, 2*b*, 2*c*. This light, which has passed through all or part of the first layer 10, comes from the external environment of the timepiece external element 2*a*, 2*b*, 2*c*, and thus of the timepiece 1, in this case mainly from solar radiation when it is of natural origin.

It should be noted that the photovoltaic module 5 is applied to the upper surface of this substrate using inkjet or screen printing processes or using a thermal evaporation printing process. Reference will be made here to a second layer 11 comprising a printed photovoltaic module 5, in particular to a photovoltaic module 5 printed on the substrate of the second layer 11.

Furthermore, it should be noted that once the photovoltaic module 5 has been applied to the substrate, a layer of a self-adhesive or adhesive substance can be deposited on all or part of the upper surface and/or of the lower surface of this substrate. Under these conditions, the second layer 11 can be a self-adhesive layer which helps to facilitate its assembly/mounting/adhesion with the other layers, in particular with the first layer 10 and/or a third layer 12 of this assembly 9*a*, 9*b*.

In this first alternative embodiment, the assembly 9*a* comprises this third layer 12 further comprising a preferably flexible or pliable substrate, comprising the electrical accumulator 6 of the autonomous lighting device 3. This substrate can be a film on which the accumulator 6 is placed. Such a substrate can be made of a material belonging to the polymer family.

This accumulator 6 can be a lithium battery or a semiconductor battery. Such an accumulator 6 is applied to an upper surface of this substrate using processes known in the prior art, such as:

- printing processes on a flexible polymer substrate, for example a lithium battery, or
- three-dimensional printing processes, for example for a semiconductor battery such as a lithium-metal semiconductor battery.

Reference will be made here to a third layer 12 comprising a printed electrical accumulator 6, in particular to an electrical accumulator 6 printed on the substrate of the third layer 12.

Such processes are used to obtain a third layer 12 comprising this accumulator 6 which is flexible and ultra-thin.

Furthermore, it should be noted that once the accumulator 5 has been applied to the substrate, a layer of a self-adhesive or adhesive substance can be deposited on all or part of the upper surface and/or of the lower surface of this substrate. Under these conditions, the third layer 12 can be a self-adhesive layer which helps to facilitate its assembly/mounting/adhesion with the other layers, in particular with the second layer 11 and/or a fourth layer 13 of this assembly 9*a*.

It should be noted that this accumulator 6 is used to store the electrical energy produced by the photovoltaic module 5 and to release it on demand to power said at least one light source 4.

Figure 2:
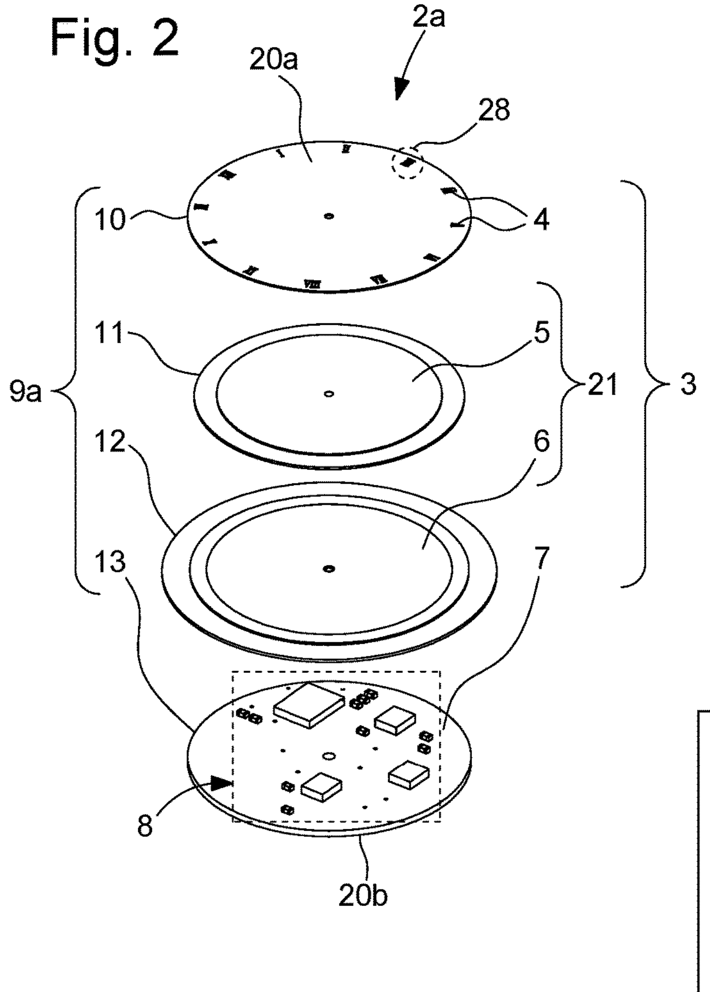
FIG. 2 shows an exploded view of a first alternative embodiment of the assembly of four stacked layers forming said dial provided with the autonomous lighting device, said layers each comprising one or more component elements of the lighting device according to the embodiments of the invention.
Figure 3:
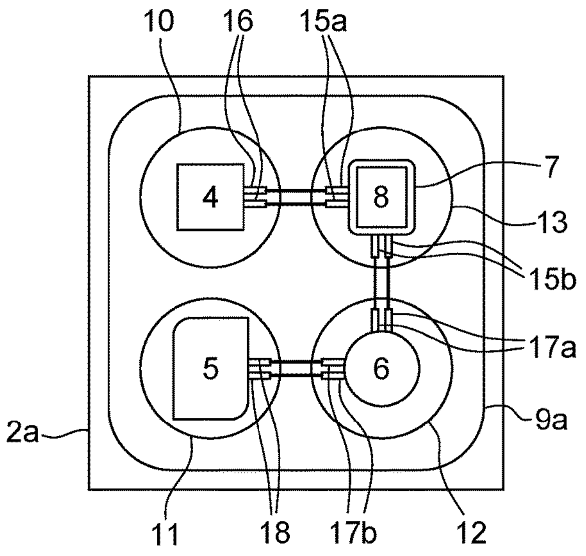
FIG. 3 shows a diagrammatic view of this first alternative embodiment of the assembly of layers forming the dial provided with the autonomous lighting device according to the embodiments of the invention.

In the first alternative embodiment illustrated in FIGS. 1, 2 and 3, this assembly 9*a* comprises this fourth layer 13 forming the hidden face 20*b* of the timepiece external element 2*a*, 2*c*. This fourth layer 13 is formed by a preferably flexible or pliable substrate comprising the control unit. Such a substrate can be, for example, a flexible PCB on which this control unit 7 is arranged, in particular on the upper surface of this PCB and thus of the substrate. In this context, the control unit 7 can be constructed on this upper surface of the substrate using three-dimensional printing processes or polymer printing processes.

Figure 4:
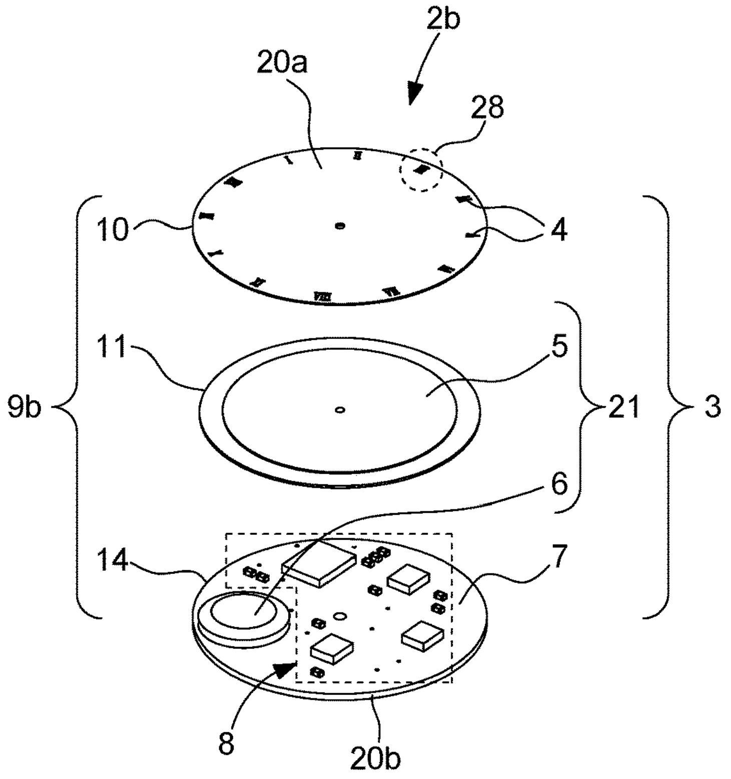
FIG. 4 shows an exploded view of a second alternative embodiment of the assembly comprising three stacked layers forming said dial provided with the autonomous lighting device, said layers each comprising one or more component elements of the lighting device according to the embodiments of the invention.
Figure 5:
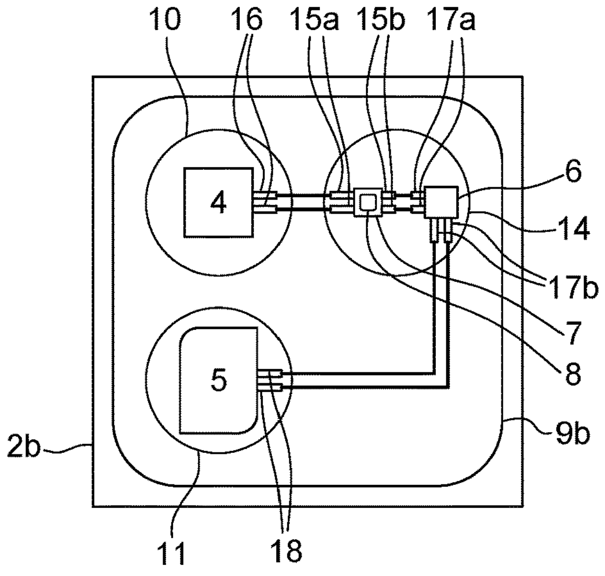
FIG. 5 shows a diagrammatic view of this second alternative embodiment of this assembly of layers forming dial provided with the autonomous lighting device, according to the embodiments of the invention.

In the second alternative embodiment illustrated in FIGS. 4 and 5, the assembly 9*b* forming the timepiece external element 2*b*, 2*c* comprises three interconnected layers 10, 11, 14. It should be noted that this second alternative embodiment differs from the first alternative embodiment in that it comprises three layers 10, 11, 14 instead of four layers 10, 11, 12, 13 as in the first alternative embodiment. In this second alternative embodiment, the electrical accumulator 6 of the autonomous lighting device 3 is now included in the third and last layer 14 of this assembly 9*b* with the control unit 7.

Such a third layer 14 forming the hidden face of the timepiece external element 2*b*, consists of a preferably flexible or pliable substrate, on which are built, preferably on the upper surface of this substrate, the accumulator 6 and the electronic circuit 8 constituting the control unit 7. The accumulator 6 and the control unit 7 can be built in this way on this upper surface of the substrate using three-dimensional printing processes or polymer printing processes. It should be noted that such a substrate can be, for example, a flexible PCB.

To summarise, in this second alternative embodiment, the assembly 9*b* thus comprises:

- a first layer 10 forming the visible face 20*a* of the timepiece external element 2*b*, 2*c* including said at least one light source 4 of the lighting device 3;
- a second layer 11 including the photovoltaic module 5, and
- the third layer 14 forming the hidden face 20*b* of the timepiece external element 2*b*, 2*c* including the accumulator 6 and the control unit 7.

It should be noted that in this second alternative embodiment, the first and second layers 10, 11 are similar to those of the first alternative embodiment of the assembly 9*a*.

Furthermore, with reference to FIGS. 3 and 5, the electronic circuit 8 of the control unit 7 comprises first connection elements 15*a* which are connected to connection elements 16 of said at least one light source 4 for managing the operation of this light source 4. This electronic circuit 8 further comprises second connection elements 15*b* connected to first connection elements 17*a* of the accumulator 6. This accumulator 6 further comprises second connection elements 17*b* connected to connection elements 18 of the photovoltaic module 5.

It should further be noted that the above-mentioned event sensors of the lighting device 3 are preferably arranged in the first layer 10 and/or the last layer 13, 14 of the assembly 9*a*, 9*b* and are connected to the control unit 7 of this device 3.

Moreover, in an alternative embodiment not shown, it should be noted that the timepiece external element can comprise an assembly 9*a*, 9*b*, the first layer 10 of which comprises a substrate made of a transparent or translucent ceramic material comprising one or more inserts made of an opaque material. It is also possible to provide a substrate made of ceramic material mixing several colours of ceramic during the injection moulding process, in particular via bi-injection moulding processes, at least one of these multiple colours being partially transparent or translucent in order to allow light to pass therethrough at predetermined locations produced by the bi-injection moulding process.

According to another alternative embodiment not shown, the timepiece external element 2*a*, 2*b*, 2*c* and in particular its first layer 10 can comprise several point light sources 4 which can be combined with one or more graphic representations inscribed in the ceramic material substrate of this layer 10, to be illuminated:

- by varying the thickness of the ceramic by mechanical or laser etching (for example recessing some $10^{th}$ or $100^{th}$ of a millimetre into the ceramic);
- or by an internal etching method in the substrate, in particular by a laser etching process;
- or by varying the density of the ceramic;
- or by opaque or semi-transparent printing on the inside or on the surface of the ceramic timepiece external element;
- or by physical vapour deposition (PVD) or similar, patterned on the inside or on the surface of the timepiece external element; or
- by a combination of these methods.

Thus, when the light emission of the point light sources 4 is switched on, the normally invisible graphic representation appears by backlight on the visible face of the timepiece external element 2*a*, 2*b*, 2*c*.

It should also be noted that the timepiece 1 according to the present invention can advantageously be used to provide various functional applications for a user of the timepiece 1. To this end, the point light sources 4 are switched on and off in such a way that the timepiece 1 has, on the timepiece external element 2*a*, 2*b*, 2*c* illuminated by the point light sources 4, at least one visual indication of a function specific to the timepiece 1 and/or relating to a measurement of an external parameter or of a parameter concerning the user of the timepiece 1. The switching on and/or off of the point light sources 4 can be controlled simultaneously and/or sequentially by the control unit 7.

By way of example, with reference to FIG. 6, one possible functional application is illustrated here for the timepiece 1, when such a timepiece 1 is an electronic or electromechanical watch, and when the control unit 7 of its timepiece external element 2*c*, in this case the bezel 26, comprises a communication module capable of exchanging data with the movement of this timepiece 1. On a point or quasi-point area 28 of this timepiece external element 2*c*, in this case the bezel 26 of this timepiece 1, a localised illumination indicates the hours, i.e. 1 o'clock in the example shown. The point or quasi-point area 28 corresponds to the position of a numeral or applique 30 on the dial 32 of the timepiece 1. Localised illumination makes it possible to read the time at night.

Another possible functional application for this same timepiece 1 is illustrated in FIG. 7. On a first point or quasi-point area 28*a* of the bezel 26 of this timepiece 1, a first localised illumination indicates the hours, i.e. 5 o'clock in the example shown. On a second point or quasi-point area 28*b* of the bezel 26 of this timepiece 1, a second localised illumination indicates the minutes, i.e. 40 minutes in the example shown. The second illumination (corresponding to the minutes) can take place simultaneously with the first illumination (corresponding to the hours). The light colours on the first and second point or quasi-point areas 28*a*, 28*b* can be identical (in the case of sequential illumination) or different (in the case of simultaneous illumination). In the latter case, the user of the timepiece 1 can distinguish the hours from the minutes. In particular, the first and second localised illuminations enable the hours and the minutes to be read at night.

Another possible functional application for this timepiece is illustrated in FIG. 8. On one or more point or quasi-point areas 28 of the bezel 26 of this timepiece 1, in this case on eight areas in the illustrated example, several localised illuminations indicate a luminous countdown or chronograph. The point or quasi-point areas 28 on the bezel can light up or go out respectively as the time elapses.

In each of the example embodiments illustrated in FIGS. 6 to 8, the first layer 10 of the timepiece external element 2*c*, in this case the bezel 26, typically comprises twelve light-emitting elements for illuminating a point or quasi-point area 28 on this bezel 26, these areas 28 becoming visible only when they are illuminated.

As an alternative to the example embodiments illustrated in FIGS. 6 to 8, the point or quasi-point areas 28 of localised illumination can be provided on the periphery of the middle 23 of this timepiece 1, rather than on the bezel 26.

Another possible functional application for the timepiece according to the invention, similar to that of FIG. 6 but not shown in the figures, consists of displaying the date via a localised illumination on a point or quasi-point area 28 of the bezel of the timepiece. The point or quasi-point area 28 corresponds to the position of a numeral or applique 30 on the dial of the timepiece 1. For dates beyond "12", the two digits of the day can be indicated sequentially, followed by the month (for example "2" then "3", then "1" for the 23rd of January). A different light colour can be used for the day and month. Localised illumination is particularly useful for reading the date at night.

It goes without saying that the present invention is not limited to the embodiments described above and that various simple modifications and alternatives can be envisaged by a person skilled in the art without departing from the scope of the invention as defined by the appended claims.

The invention claimed is:

1. A timepiece comprising:

at least one timepiece external element comprising a visible face formed by a transparent or translucent body comprising an autonomous lighting device, said timepiece external element being formed by an assembly of at least three layers joined together by a joining element to form a monolithic assembly, the layers being stacked to overlap in an axial direction of the timepiece, each of the layers comprising one or more of the following functional elements of said lighting device:

at least one light source capable of generating light in the visible face of the timepiece external element;

a self-contained power supply unit; and a control unit configured to manage the operation of the light source;

said at least one light source being configured to produce localised light on a point or quasi-point area of the visible face of the timepiece external element, so as to produce localised illumination on said timepiece external element.

2. The timepiece according to claim 1, wherein said assembly comprises a first layer forming the visible face comprising said at least one point light source.

3. The timepiece according to claim 1, wherein each point light source is:

a light-emitting element; or a quantum dot or box.

4. The timepiece according to claim 2, wherein said assembly comprises, in addition to the first layer, the following successive layers:

a second layer comprising a photovoltaic module constituting the self-contained power supply unit;

a third layer comprising an electrical accumulator constituting the self-contained power supply unit;

a fourth layer forming a hidden face of the timepiece external element comprising the control unit.

5. The timepiece according to claim 2, wherein said assembly comprises, in addition to the first layer, the following successive layers:

a second layer comprising a photovoltaic module constituting the self-contained power supply unit; and a third layer forming a hidden face of the timepiece external element comprising the control unit and an electrical accumulator constituting the self-contained power supply unit.

6. The timepiece according to claim 1, wherein the functional elements are printed on substrates making up the layers of the assembly forming said at least one timepiece external element.

7. The timepiece according to claim 2, wherein the first layer is rigid relative to the other layers in the assembly, which are flexible.

8. The timepiece according to claim 1, wherein the point light sources are configured in such a way that each point or quasi-point area of the visible face that can be illuminated is capable of being illuminated by a single monochromatic point light source.

9. The timepiece according to claim 1, wherein the point light sources are configured in such a way that each point or quasi-point area of the visible face that can be illuminated is capable of being illuminated by several point light sources having different light colours.

10. The timepiece according to claim 1, wherein said at least one timepiece external element is chosen from one of the following: a back, a middle, a dial, a bracelet strand, a bezel, a flange, a push-button, a winding button and/or a winding button fitted with a cap.

11. The timepiece according to claim 1, wherein the layers are mounted on a common axis.

12. The timepiece according to claim 1, wherein each of the layers is circular and planar.

13. The timepiece according to claim 1, wherein the joining element that joins all of the layers of the assembly together is an adhesive.

14. The timepiece according to claim 4, wherein said second layer is positioned directly below said first layer and is directly connected to said first layer;

wherein said third layer is positioned directly below said second layer and is directly connected to said second layer; and wherein said fourth layer is positioned directly below said third layer and is directly connected to said third layer.

15. The timepiece according to claim 5, wherein said second layer is positioned directly below said first layer and is directly connected to said first layer; and wherein said third layer is positioned directly below said second layer and is directly connected to said second layer.

* * * * *